United States Patent [19]

Mattiebe

[11] 4,384,914
[45] May 24, 1983

[54] ARRANGEMENT FOR WELDING BAGS

[75] Inventor: Günter Mattiebe, Bielefeld, Fed. Rep. of Germany

[73] Assignee: Gartemann & Hollmann GmbH, Bielefeld, Fed. Rep. of Germany

[21] Appl. No.: 271,843

[22] Filed: Jun. 9, 1981

[30] Foreign Application Priority Data

Jun. 25, 1980 [DE] Fed. Rep. of Germany ....... 3023662

[51] Int. Cl.³ .............................................. B32B 31/00
[52] U.S. Cl. ..................................... 156/443; 53/373; 156/499; 493/192
[58] Field of Search ............... 156/497, 499, 442, 443; 493/192; 53/373, 375; 229/55, 57

[56] References Cited

U.S. PATENT DOCUMENTS 3,474,711 10/1969 Swingar .......................... 156/442 X
3,807,626 4/1974 Goodrich .......................... 229/57 X
3,855,037 12/1974 Imhagen .............................. 156/497
3,953,272 4/1976 Webber ............................ 493/192 X Primary Examiner—David A. Simmons
Attorney, Agent, or Firm—Michael J. Striker

[57] ABSTRACT

An arrangement for welding multi-ply staggered bags has two guiding elements for guiding a multi-ply material so that the inner ply is staggered with itself and one part of the inner ply is staggered on another part thereof, a heating aggregate which supplies hot air for welding, and a bending member arranged to bend the staggered parts of the inner ply so that they partially separate from one another and form a gap into which the hot air from the heating aggregate is supplied.

8 Claims, 2 Drawing Figures

ARRANGEMENT FOR WELDING BAGS

BACKGROUND OF THE INVENTION

The present invention relates to an arrangement for welding bags. More particularly, it relates to an arrangement of welding staggered bags with inner plies coated by a synthetic plastic material. The staggered bags with inner layers coated by a weldable synthetic plastic material are much easier to manufacture than the staggered bags with inserted bottom-closed sacks of polyethylene. However, such bags could not be produced in a simple way with completely moisture-impermeable bottoms. Complete moisture tightness in these staggered bags can be attained only in the case when the coated inner layers are completely welded over the entire width of the staggered bag. Special problems which took place here is that hot air supplied from a heating apparatus for welding must be supplied between opposite parts of the inner layer in the region of the end portion of a staggered tube to be welded. However, this is absolutely necessary to provide reliable welding of the entire bag width of the inner layer of the tube.

SUMMARY OF THE INVENTION

Accordingly, it is an object of the present invention to provide an arrangement for welding multi-ply or staggered bags, which avoids the disadvantages of the prior art.

More particularly it is an object of the present invention to provide an arrangement for welding bags in which heat from a heating aggregate can easily and reliably enter a space between parts of an inner layer of the bag to be welded.

In keeping with these objects and with others which will become apparent hereinafter, one feature of the present invention resides, briefly stated, in an arrangement which has guiding means for guiding a multi-ply material having an inner ply and outer ply so that the inner ply is staggered with itself and one part of the inner ply is staggered on another part thereof, means for welding the staggered parts of the inner ply with one another under the action of heat, and means for partially separating the staggered parts of the inner ply from one another first to form therebetween a gap into which the heat of the welding means is supplied.

When the arrangement is designed in accordance with the present invention, the parts of the inner ply which are to be welded with one another are partially separated so as to form the gap, and heat from the welding means is supplied directly into these gaps so as to provide for easy and reliable welding of the parts of the inner ply.

More particularly, the guiding means include two guiding elements which form a common guiding surface and are spaced from one another by such a distance that one of the guiding elements supports all plies of the material, whereas the other of the guiding elements supports only one part of the inner ply with associated one part of the outer plies. The separating means include a pressing bar which presses the material in the region of the staggered parts of the inner ply downwardly below the above-mentioned common plane of the guiding element. The one guiding element which guides all the plies of the material is located inwardly of the pressing bar whereas the other guiding element which guides only one part of the inner ply with associated parts of the outer plies, is located outwardly of the pressing bar.

Because of the guiding elements forming a common guiding plane and their distance therebetween, with the assumption that the inner ply is staggered with itself in contrast to the known conventional methods, the bending of the staggered bag hose results in the fact that this region is pressed downwardly below the common guiding plane, whereby one part of the inner ply displaces from the other part thereof so as to form the gap therebetween. The hot air from the heating means can unobjectionably flow into the gap between the displaced parts of the inner ply and thereby the inner coating of the inner ply can be welded over the entire width of the bag by the hot air or brought into a weldable condition. The moisture-tight welding is performed then in a subsequent pressing step.

The staggered bags manufactured by the inventive arrangement can be utilized in new fields of application. They can be utilized in such fields when absolute moisture tightness is required. For example, they can particularly be utilized as garbage bags for hospitals and clinics, and generally everywhere when moisture susceptible goods must be stored in the bags.

In accordance with another feature of the present invention, the guiding means is formed as end faces of heat directing members of a heating apparatus. The heat directing members surround a source of heat of the heating means. When the guiding elements are formed actually as parts of the heating means, the inventive arrangement has a simple construction.

Finally, in accordance with a further advantageous feature of the present invention the heat directing members of the heating means converge from below upwardly to the end faces which form the guiding elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

An arrangement for welding is utilized for welding multi-ply or staggered bags which have an inner ply coated with a weldable synthetic plastic material, for example polyethylene. The bags are produced from a known staggered material web which forms a tube portion with one end closed for forming a bottom of the staggered bag.

Figure 1:
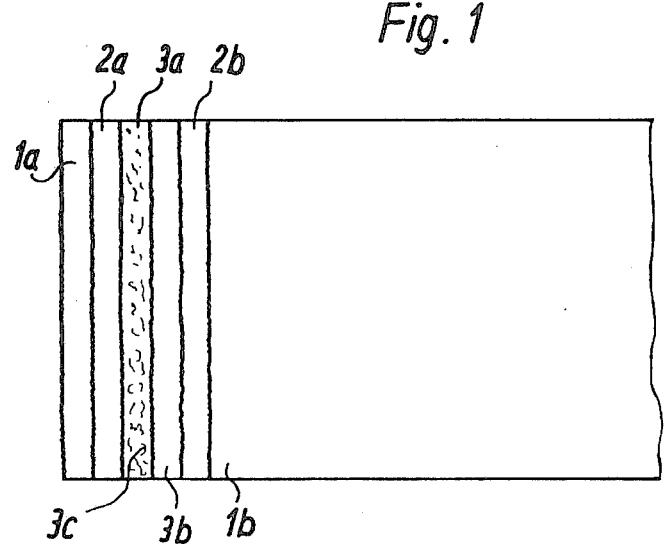
FIG. 1 is a view showing end portions of a staggered bag, to be welded with one another.

When the tube portion is formed, both opposite parts of the inner layer coated with the synthetic plastic material are welded with one another. FIG. 1 shows a view from below of the closed tube end of a staggered bag. A special feature of this bag is that in correspondence with the process of treating in the welding arrangement, both coated parts of the inner layer located opposite to one another after the formation of the tube are staggered. As can be seen from FIG. 1, the opposite part of the tube is arranged so that they include the staggered layers 1a, 1b, 2a, 2b, 3a and 3b. The parts 3a and 3b of the inner layer are provided with coatings 3c of synthetic plastic material which face toward one another and form opposite parts of the inner ply or layer.

Figure 2:
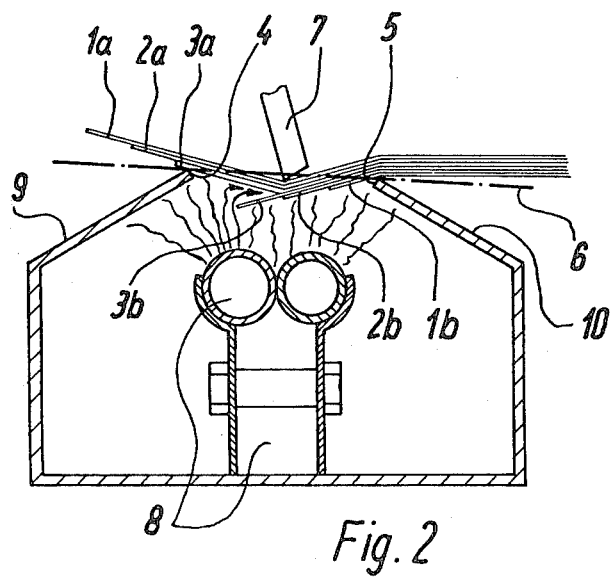
FIG. 2 is a schematic view showing an arrangement for welding the end portions of the staggered bags, in accordance with the present invention.

FIG. 2 shows an arrangement for welding the ends of the hoses of the staggered bags in accordance with the present invention. The arrangement has two guiding elements 4 and 5. The guiding elements 4 and 5 form together a common guide plane 6. The distance between the guiding elements 4 and 5 is selected so that the inner guiding element 5, that is the guiding element which is located closer to the remaining part of the hose portion, supports all plies of the tube portion. On the other hand, the outer guiding element 4, that is the guiding element which is located further from the tube portion, supports only one part of the inner ply and the associated parts 1a and 2a of the outer plies.

A bending bar 7 is provided between the guiding elements 4 and 5 above the path of movement of the hose portion. The arrangement is so designed that the bending bar 7 presses the staggered bag hose to a point located below the common guiding plane 6 of the guiding elements 4 and 5. This results in sharp bending or buckling of the staggered bag tube.

Because of the above described support of the individual material plies of the staggered bag material on the guiding elements 4 and 5 and the bending of the same, the sharp bending or buckling takes place between the outwardly offset parts 3a and the inwardly offset parts 3b of the inner plies. The parts 3a and 3b of the inner ply are opened or displaced relative to one another so as to form a gap therebetween.

The arrangement is provided with a heating apparatus 8 emanating a hot air. The heating apparatus 8 may be formed as infrared middle wave-double heating pipe arranged below the path of movement of the staggered bag material. The hot air from the heating apparatus 8 flows into the gap between the displaced parts 3a and 3b of the inner layer and makes the above-mentioned coating of synthetic plastic material 3c ready for welding. The welding is performed during an immediately following folding and pressing step.

As can be seen from FIG. 2 the arrangement is provided with heat directing or heat conducting heat members 9 and 10 which together with other walls form a housing for the heating apparatus 8. The guiding elements 4 and 5 are formed as end faces of the heat members 9 and 10. The heat members 9 and 10 converge upwardly to their end faces or the guiding elements 4 and 5, toward one another. Thereby the hot air of the heating apparatus 8 is reliably directed toward the tube end of the staggered bag.

It will be understood that each of the elements described above, or two or more together, may also find a useful application in other types of constructions differing from the types described above.

While the invention has been illustrated and described as embodied in an arrangement for welding multi-plie staggered bags it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for welding multi-ply bags having an inner ply and outer plies, comprising guiding means for guiding a multi-ply material having an inner ply and outer plies so that the inner ply is staggered on another part thereof, said guiding means including two guiding elements forming a common guiding surface and being spaced from one another by such a distance that one of said guiding elements supports all plies of the material, whereas the other of said guiding elements supports only one part of the inner ply with associated one part of the outer plies; means for partially separating the staggered parts of the inner ply from one another so as to form therebetween a gap into which the heat of said welding means is supplied, said separating means being formed as a separating element located above the staggered parts of the inner ply and movable in the region between said guiding elements from above the staggered parts of the inner ply downwardly to a point below said common plane of said guiding elements so as to bend the material in the region of the staggered parts of the inner ply without a counterelement and to thereby partially separate the staggered parts from one another in response to the bending so as to form the gap therebetween; and means for welding the staggered parts of the inner ply with one another, located below the staggered parts of the inner ply and arranged to supply heat from below directly into the thus formed gap between the separated parts of the inner ply without first penetrating through the parts of the inner ply and without introducing said welding means into the gap.

2. An arrangement as defined in claim 1, wherein said guiding elements are spaced from one another in a substantially horizontal direction, said separating element and said welding means being spaced from one another in a substantially vertical direction.

3. An arrangement as defined in claim 1, wherein said guiding elements are arranged so that when the parts of the inner ply are staggered, a remaining part of the inner ply is not staggered, said one guiding element being located inwardly at and said other guiding element being located outwardly of the bending location, as considered relative to the not staggered part of the inner ply.

4. An arrangement as defined in claim 1, wherein said separating element is a pressure bar movable downwardly to bend the material in the region of the staggered parts of the inner ply.

5. An arrangement as defined in claim 1 wherein the inner ply of the material is provided with a coating of a weldable synthetic plastic material, said welding means being arranged to weld the coating of the inner ply.

6. An arrangement for welding multi-ply bags having an inner ply and outer plies, comprising guiding means for guiding a multi-ply material having an inner ply and outer plies so that the inner ply is staggered with itself and one part of the inner ply is staggered on another part thereof, said guiding means including two guiding elements forming a common guiding surface and being spaced from one another by such a distance that one of said guiding elements supports all plies of the material, whereas the other of said guiding elements supports only one part of the inner ply with associated one part of the outer plies; means for welding the staggered parts of the inner ply with one another under the action of heat, said welding means including a heat directing means, said guiding elements being formed on said heat directing means; and means for partially separating the staggered parts of the inner ply from one another so as to form therebetween a gap into which the heat of said welding means is supplied.

7. An arrangement as defined in claim 6, wherein said welding means includes a source of heat, said heat directing means including sheet members surrounding said source of heat and having end faces which form said guiding elements.

8. An arrangement as defined in claim 7, wherein said sheet members of said heat directing means converge from below upwardly to said end faces which form said guiding elements.

* * * * *